US006767591B2

(12) United States Patent
Meccia et al.

(10) Patent No.: US 6,767,591 B2
(45) Date of Patent: Jul. 27, 2004

(54) METHOD OF MAKING A DRY ERASABLE SUBSTRATE

(75) Inventors: Mark A Meccia, Glenview, IL (US); Gregg A Steliga, North Barrington, IL (US)

(73) Assignee: InVision Enterprises, Inc., Chicago, IL (US)

( * ) Notice: Subject to any disclaimer, the term of this patent is extended or adjusted under 35 U.S.C. 154(b) by 0 days.

(21) Appl. No.: 10/702,432

(22) Filed: Nov. 7, 2003

(65) Prior Publication Data

US 2004/0089411 A1 May 13, 2004

Related U.S. Application Data

(62) Division of application No. 09/900,081, filed on Jul. 6, 2001, now abandoned.

(51) Int. Cl.[7] .......... C08F 2/48

(52) U.S. Cl. .......... 427/508; 427/208; 427/208.4; 427/377; 427/385.5; 427/407.1; 427/419.1; 427/558; 427/559; 427/595

(58) Field of Search .......... 427/508, 558, 427/559, 595, 208, 208.4, 377, 385.5, 407.1, 419.1

(56) References Cited

U.S. PATENT DOCUMENTS

| | | | | |
|---|---|---|---|---|
| 3,989,416 | A | * | 11/1976 | Louden |
| 4,393,103 | A | * | 7/1983 | Louden |
| 4,755,550 | A | * | 7/1988 | Shuman et al. |
| 4,940,628 | A | * | 7/1990 | Lin et al. |
| 4,980,212 | A | * | 12/1990 | Marquis et al. |
| 5,010,671 | A | * | 4/1991 | Stonehouse |
| 5,024,898 | A | * | 6/1991 | Pitts et al. |
| 5,037,702 | A | * | 8/1991 | Pitts et al. |
| 5,299,833 | A | * | 4/1994 | Madole, Jr. |
| 5,318,825 | A | * | 6/1994 | Naber |
| 5,361,164 | A | * | 11/1994 | Steliga |
| 5,763,555 | A | * | 6/1998 | Skoglund |
| 5,874,144 | A | * | 2/1999 | Kumar et al. |
| 5,900,094 | A | * | 5/1999 | Santini et al. |
| 6,013,149 | A | * | 1/2000 | Timmerman et al. |
| 6,067,266 | A | * | 5/2000 | Donelan |
| 6,146,711 | A | * | 11/2000 | Courtoy et al. |
| 6,251,500 | B1 | * | 6/2001 | Varga et al. |
| 6,265,074 | B1 | * | 7/2001 | Shah et al. |
| 6,318,825 | B1 | * | 11/2001 | Carau, Sr. |
| 6,403,189 | B1 | * | 6/2002 | Donahue |
| 6,448,302 | B1 | * | 9/2002 | Dawson et al. |
| 2001/0024720 | A1 | * | 9/2001 | Sweet et al. |

* cited by examiner

*Primary Examiner*—Bernard Pianalto
(74) *Attorney, Agent, or Firm*—Pillsbury Winthrop LLP

(57) ABSTRACT

A flexible and self-adhesive repositionable dry erasable markerboard is disclosed, together with a method for making such repositionable dry erasable markerboard. The repositionable dry erasable markerboard is made of a second layer, comprising a paper layer, with a first layer, comprising a dry erasable layer applied to the upper surface of the second layer, and a third layer, comprising a pressure sensitive adhesive layer, applied to the lower surface of the second layer. The dry erasable first layer may be either a coating cured under the presence of a nitrogen blanket or a film. The pressure sensitive adhesive of the third layer may be applied to the entire surface of the second layer or selectively zone-coated. The pressure sensitive adhesive of the third layer may be covered with a fourth layer, comprising a removable liner. The paper second layer may be coated and/or printed. The repositionable dry erasable markerboard is flexible and may be rolled into a tube. The repositionable dry erasable markerboard may be cut into individual repositionable dry erasable markerboards and formed into a pad. The repositionable dry erasable markerboard may be perforated.

40 Claims, 8 Drawing Sheets

METHOD OF MAKING A DRY ERASABLE SUBSTRATE

This is a divisional application of U.S. application Ser. No. 09/900,081, filed Jul. 6, 2001 now abandoned, the entire contents of which are hereby incorporated by reference.

BACKGROUND OF THE INVENTION

1. Field of the Invention

The present invention relates to a flexible and repositionable self-adhesive dry erasable flexible paper markerboard, constructed with a UV coating applied under the presence of an inerting blanket of nitrogen and to a method of manufacturing such a markerboard.

2. Description of the Related Art

It is commonly known in the art that surfaces are available that may be marked on with dry wipe markers, also known as dry erase markers or dry erasable markers. These markers use solvent or water based ink which dries to a powder after it has been applied to a surface, commonly a smooth, glossy, porcelain or plastic surface. These markers commonly come in different colors.

When a user writes on a dry erasable surface using conventional dry erasable markers, the ink readily adheres to the surface and may be applied in thick or thin strokes. The ink, after it dries, will adhere to the dry erasable surface for a long period of time, e.g., at least several months, without significantly flaking or otherwise peeling away from the dry erasable surface. The writing surfaces, often white in appearance, adapted for use with such markers are commonly known as "dry erase boards," "dry erasable boards," "marker boards," or "white boards." These terms are used interchangeably in the specification and claims.

The dry erasable marker ink, when applied, dries to a powder and may be readily wiped off from the dry erasable surface with a dry cloth or dry eraser. No solvent is ordinarily needed in the erasing; hence these markers are known as "dry wipe," "dry erase," or "dry erasable." These terms also are used interchangeably in the specification and claims. One common dry erase marker is sold by the Sanford Corp., Bellwood, Ill. under the registered trademark, EXPO.RTM.

This method of erasable writing is to be contrasted with the earlier-known use of chalk on slate or other surfaces. This is also to be contrasted with those surfaces where markers were used and the markings could only be removed by application of solvents, such as water, or an organic solvent, such as mineral spirits.

Prior to the present invention, dry erasable markerboards have not been not been made from a flexible paper with a repositionable pressure sensitive adhesive nor have they utilized UV cured coatings applied under the presence of a nitrogen blanket.

The flexible paper allows the markerboard to be transported and stored more easily than conventional markerboards. For example, a large markerboard can easily be rolled into a tube or rolled around a core and placed in a small space, such as a bag or an overhead compartment of an airplane. Furthermore, because the dry erasable markerboard of the present invention utilizes a paper layer, unlike conventional flexible markerboards utilizing a polyester or vinyl layer, the material of the present invention is less expensive to manufacture, and can be lighter in weight. Furthermore, the UV coating is applied under the presence of a nitrogen blanket, which excludes the presence of oxygen. The absence of oxygen allows the specially formulated UV coating to cure significantly faster than other UV coatings, thus decreasing the overall cost of production of the present invention. Furthermore, nitrogen curing leads to optimal polymerization of the UV coating, thus imparting the utmost in surface hardness and scratch resistance to the dry erasable surface.

Rather than positioning several conventional markerboards together for a large presentation, the present invention can be used in large continuous pieces without seams. The present invention may be perforated or cut with a cutting device to shape the material into pieces of different sizes.

The pressure sensitive adhesive used in the present invention allows multiple applications of a markerboard to different surfaces, which would not be possible with the application of permanent adhesive, as is traditionally used in the art. Further, the present invention can be temporarily applied to a variety of surfaces (both planar and non-planar) without the use of mounting hardware, such as brackets, nails, or screws, or a mounting apparatus, such as a frame or easel. Unlike traditional mounting hardware, the pressure sensitive adhesive in the present invention need not materially alter the surface to which it is adhered. Pressure sensitive adhesives are well-known in the art as, for example, the pressure sensitive adhesive used by 3M Company on its Post-It® Notes product.

SUMMARY OF THE INVENTION

The present invention provides a flexible, repositionable dry erasable markerboard that can be mounted on a wall or other surface (both planar surfaces and non-planar surfaces) without the use of mounting hardware. Further, the invention can be repositioned and reused without materially altering the surface to which it is applied. The invention can be perforated or cut with a cutting device to create markerboards of various shapes and sizes.

The present invention is flexible enough to be self-wound or rolled around a core or tube so that it does not crush in storage. The present invention can be manufactured in a roll, with or without perforations, such that individual pieces of markerboard may be removed from the roll as needed.

The repositionable dry erasable markerboard may be cut into smaller individual markerboards and stacked in pads for ease of use. These pads can be formed by adhering repositioned dry erasable markerboard sheets to one another by the layer of pressure sensitive adhesive.

Alternatively, a stack of repositionable dry erasable markerboard sheets can be secured into a pad. Pads of repositionable dry erasable markerboard sheets can be created by, for example, covering a portion of a stack of repositionable dry erasable markerboard sheets with a cover made of, for example, paper, fabric, or plastic. This cover can than be bound to the stack of repositionable dry erasable markerboard sheets with, for example, staples. Pads of repositionable dry erasable markerboard sheets can also be formed by applying a permanent adhesive to a portion on the back of each sheet, above a line of perforations, and then stacking the sheets in a pad. The individual repositionable dry erasable markerboard sheets are thus adhered to each other by the permanent adhesive on the back of one sheet being in contact with the front of the next sheet. Individual sheets can be torn as needed from the pad at the line of perforations while the portion of the markerboard sheet to which the permanent adhesive is applied remains adhered to the pad until all the markerboards sheets are removed from the pad.

Alternatively, repositionable dry erasable markerboard sheets can be secured in a pad by a permanent adhesive that is applied to a top edge of each sheet, preferably above a line of perforations, such that individual markerboards sheets may be torn away for use. Repositionable dry erasable markerboard sheets can also be secured in a pad by a spiral binding at the top or on the side of the pad. Other means of securing repositionable dry erasable markerboard sheets into pads are possible and would be known to one skilled in the art.

In one embodiment, the first layer, which is a dry erasable layer, is a coating. In this case, in the preferred embodiment, a clay coating or a coating of polyethylene is applied to the second layer, which is a paper layer, prior to application of the dry erasable coating to minimize absorption of the dry erasable coating into the second layer. If a clay coating is used it can also provide the benefit of enhancing the quality of images that may be printed on the second layer after the clay coating or coating of polyethylene is applied. In another embodiment, the first layer is a dry erasable film.

The paper of the second layer of the invention can vary in weight, thickness, and composition. Optionally, the paper of the second layer can be colored or printed with a variety of designs or logos. The paper of the second layer is substantially opaque such that the surface to which the markerboard is attached is not readily visible through the markerboard.

The third layer is a pressure sensitive adhesive layer that allows the application of the repositionable dry erasable markerboard to a variety of surfaces such as steel, drywall, wallpapered walls, painted walls, chalkboards, whiteboards, tabletops, or paper. Further, the repositionable dry erasable markerboard can be repositioned and reapplied (immediately or several years later) without materially altering the surface to which it was applied.

An optional fourth layer, which is a removable liner layer, similar to those used with conventional shelf-papering products, can be used to keep the third layer free of contamination until the removable liner of the fourth layer is removed prior to use of the markerboard. The removable liner can be scored in a manner that allows it to be easy peeled away from the sheet.

DETAILED DESCRIPTION OF THE INVENTION

Figure 1:
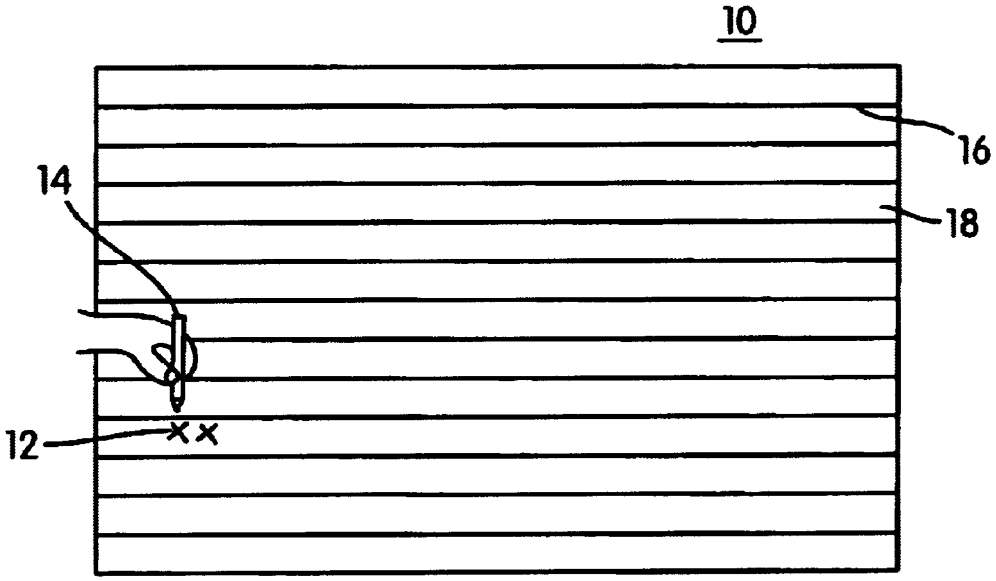
FIG. 1 is a drawing of the flexible and repositionable markerboard of the present invention with an optional printed design, after a dry erase marker has marked on the repositionable markerboard.

The present invention is a repositionable dry erasable markerboard manufactured with a UV cured coating applied under the presence of a nitrogen blanket or by laminating a dry-erasable film to paper. As seen in FIG. 1, this repositionable dry erasable markerboard 10 is able to be printed with various images 16. The first layer 18, which is a dry erasable layer, of the markerboard 10 allows the release of the markings 12 made by dry erase marker 14 onto the repositionable dry erasable markerboard 10.

Figure 2:
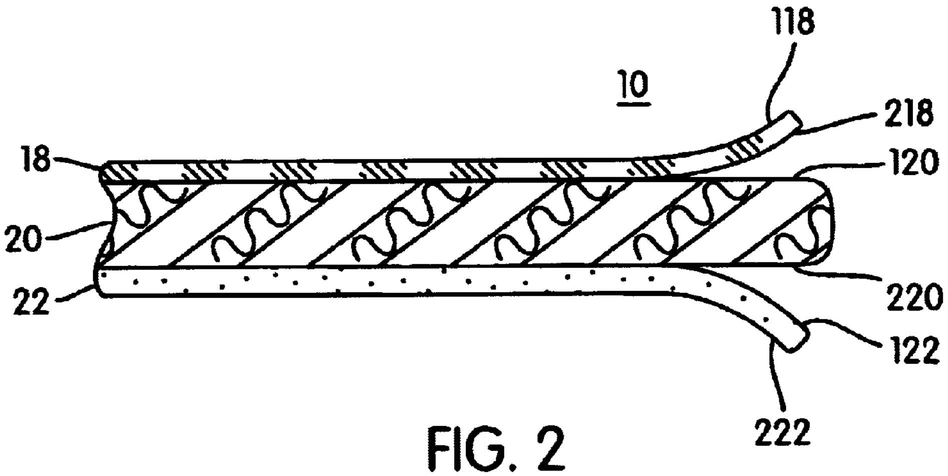
FIG. 2 is a schematic cross-sectional view of the present invention.

Referring to FIG. 2, several attributes of the present invention render it superior to markerboards known in the art. The present invention, which uses a second layer 20 of paper, is lighter weight, more flexible, and less expensive than markerboards commonly made of, for example, polyester or vinyl. This repositionable dry erasable markerboard 10, preferably having a weight of 0.5 to 1.0 ounces per square foot, and more preferably 0.6 ounces per square foot, is especially important when using a pressure sensitive adhesive, which will not hold a markerboard for a sufficient period of time on a surface if the markerboard's weight is sufficiently heavy to overcome the adhesive quality of the pressure sensitive adhesive. The greater flexibility of the second layer 20 of the repositionable dry erasable markerboard 10 permits it to be applied initially and reapplied subsequently to a variety of surfaces that would not hold an inflexible markerboard such as, for example, curved surfaces, corners, or surfaces with protrusions. Further, the greater flexibility of the second layer 20 of the repositionable dry erasable markerboard 10 permits the markerboard to be transported and stored in a roll. The use of a third layer 22 of pressure sensitive adhesive allows the markerboard 10 to be reused or repositioned on a variety of surfaces.

A preferred embodiment of the invention will now be described in detail by reference both to the materials involved and by reference to the process of manufacture. Referring to FIGS. 1 and 2, a preferred embodiment of the repositionable dry erasable markerboard 10 comprises three layers. The first layer 18 consists of a dry erasable layer with dry erasable upper surface 118, which is the writing surface.

Thus, an essential feature of this first layer 18 is that it have properties which allow the release of the markings 12 made by a dry erase marker 14. This release is accomplished by application of a cloth, or felt or other dry erase marker eraser (not shown). This first layer 18 may be applied either as a coating or a film. Preferably, if the first layer 18 is a coating, the second layer 20 is clay coated or a coated with a coating of polyethylene prior to application of the first layer 18. Clay-coated paper is available from Badger Paper Mills, Inc. or Boise Cascade, Inc. Preferably, the first layer 18 is a dry erase UV curable coating designed to be cured under the presence of a nitrogen blanket, such as the coating sold by Northwest Coating Corp. as 17503 Dry Erase Topcoat.

Alternatively, the first layer 18 is a polypropylene film, such as Flexmark® OP 100 sold by Flexcon Co. The first layer 18 is preferably substantially transparent.

The second layer 20 is made with paper and can vary in weight, thickness, and composition. For maximum flexibility in connection with the invention, a paper having a weight rating of 20 to 108 pounds may be used. The inventor has found that paper having a weight of 78 pounds is particularly suited to carrying out the invention because of its combination of strength, overall weight, opacity, and flexibility. While, as previously noted, the second layer 20 is preferably coated in a manner such as clay coating or coating with polyethylene especially if the first layer 18 is a dry erase coating, the second layer 20 does not need to be coated in order for it to receive print or a dry erase film.

Preferably, the second layer 20, being made of paper, is print receptive. The paper may be printed by gravure, sheet-fed lithography, flexography, silkscreen, digital printing, dye electric printing, dye sublimation, or other suitable means. More preferably, printing is done by gravure or on a roll-to-roll flexographic web press.

The third layer 22 is made of a pressure sensitive adhesive, which allows the material to be applied to a wall or other surface and then repositioned and reused. Many pressure sensitive adhesives are known in the art and are available for this purpose, such as National Starch's microsphere adhesive Multi-Lok 38-454A.

Figure 3:
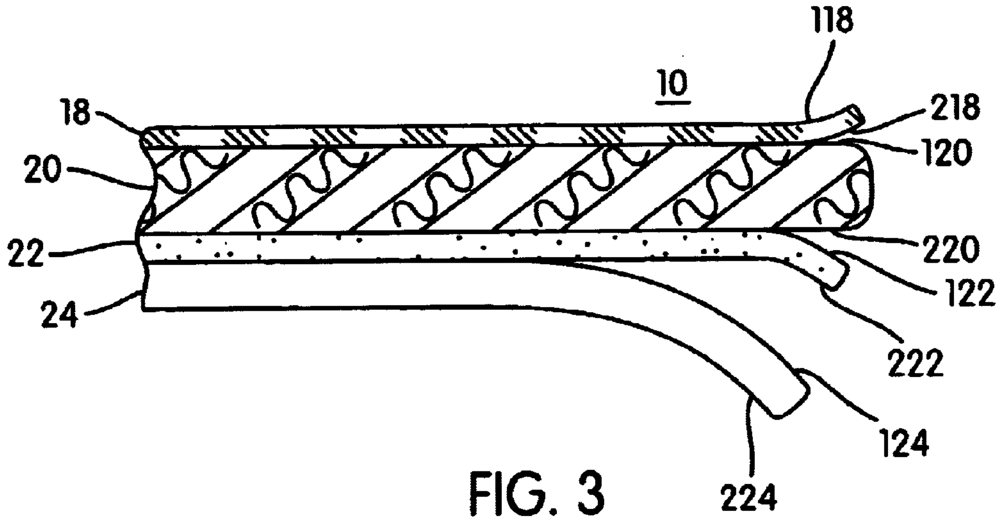
FIG. 3 is a schematic cross-sectional view of the present invention with an optional fourth layer of a removable liner applied to the pressure sensitive adhesive of the third layer.

FIG. 3 shows an alternate embodiment of the invention. A fourth layer 24 may include a silicone-coated removable liner which is applied to the lower surface 222 of the pressure sensitive adhesive of the third layer 22. The removable liner of the fourth layer 24 is made of paper or a film such as polyethylene or polypropylene. For maximum flexibility in connection with the invention, a paper of a weight rating of 20 to 90 pounds may be used. Most preferably, a paper of a weight rating of 48 pounds is used. The removable liner of the fourth layer 24 prevents the pressure sensitive adhesive of the third layer 22 from adhering to anything until such adhesion is intended. The removable liner of the fourth layer 24 is removed from the pressure sensitive adhesive of the third layer 1, exposing the lower surface 222 of the pressure sensitive adhesive of the third layer 1, when it is intended to adhere the pressure sensitive adhesive of the third layer 22 of the repositionable dry erasable markerboard 10 to a surface for temporary mounting.

Figure 4:
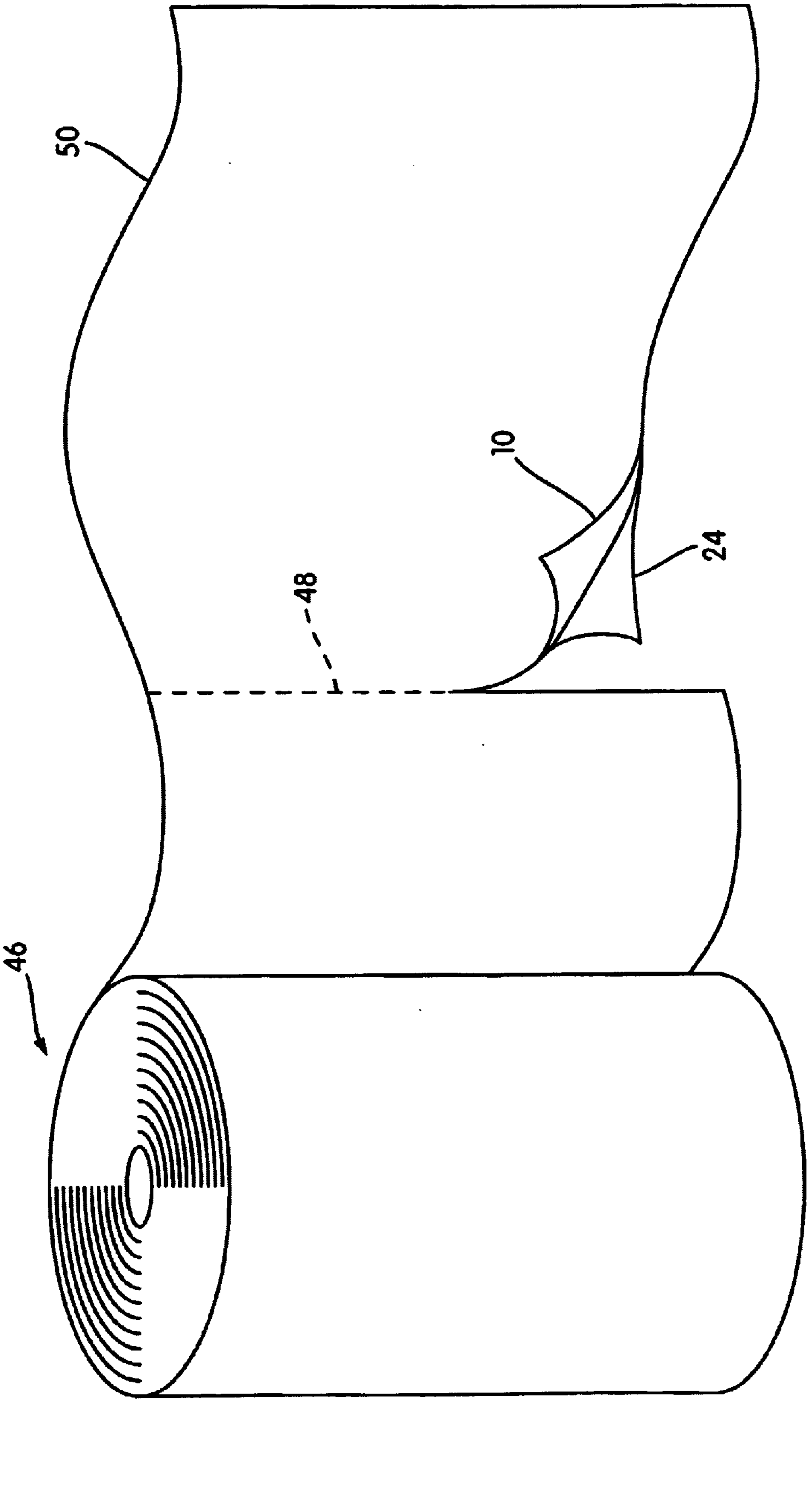
FIG. 4 is a schematic of the flexible and repositionable dry erasable markerboard formed into a tube-shaped roll and perforated for removal of single sheets from the roll.

FIG. 4 shows an embodiment of the invention wherein the markerboard 10 is formed into a roll 46. Individual sheets 50 of repositionable dry erasable markerboard 10 with removable liner of the fourth layer 24 can be torn off the roll 46 at line of perforations 48, or optionally cut with a cutting device (not shown) with or without the use of the line of perforations 48. The repositionable dry erasable markerboard 10 may also be manufactured in this embodiment without the presence of the removable liner of the fourth layer 24.

Figure 5:
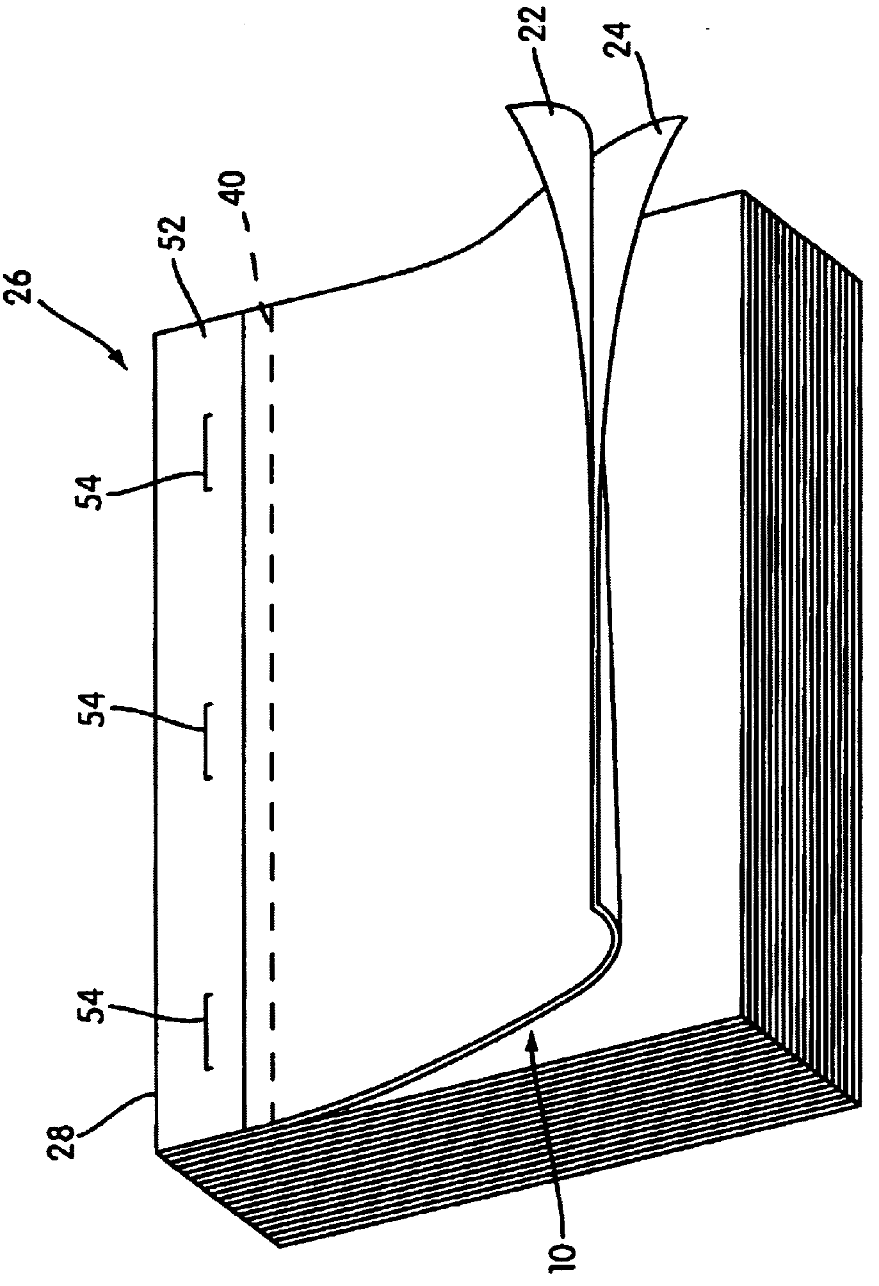
FIG. 5 is a schematic of the flexible and repositionable dry erasable markerboard cut into individual markerboards and fixed into a pad with a cover to secure the markerboards in a pad and staples to bind the cover to the pad of markerboards.

FIG. 5 shows individual repositionable dry erasable markerboards 10 with line of perforations 40 which is parallel to top edge 28. The individual repositionable dry erasable markerboards 10 are adhered in a pad 26 with cover 52 and staples 54. The cover 52 secures a stack of repositionable dry erasable markerboards 10 by being folded over the top portion of the pad 26 and the staples 54 bind the cover 52 to the stack to form a pad 26. In this manner, once the individual repositionable dry erasable markerboards 10 are adhered in a pad 26, they are secured by the cover 52 and staples 54 until they are individually removed for use. Individual repositionable dry erasable markerboards 10 may then be removed from pad 26 by tearing the markerboard 10 at line of perforations 40.

Figure 6:
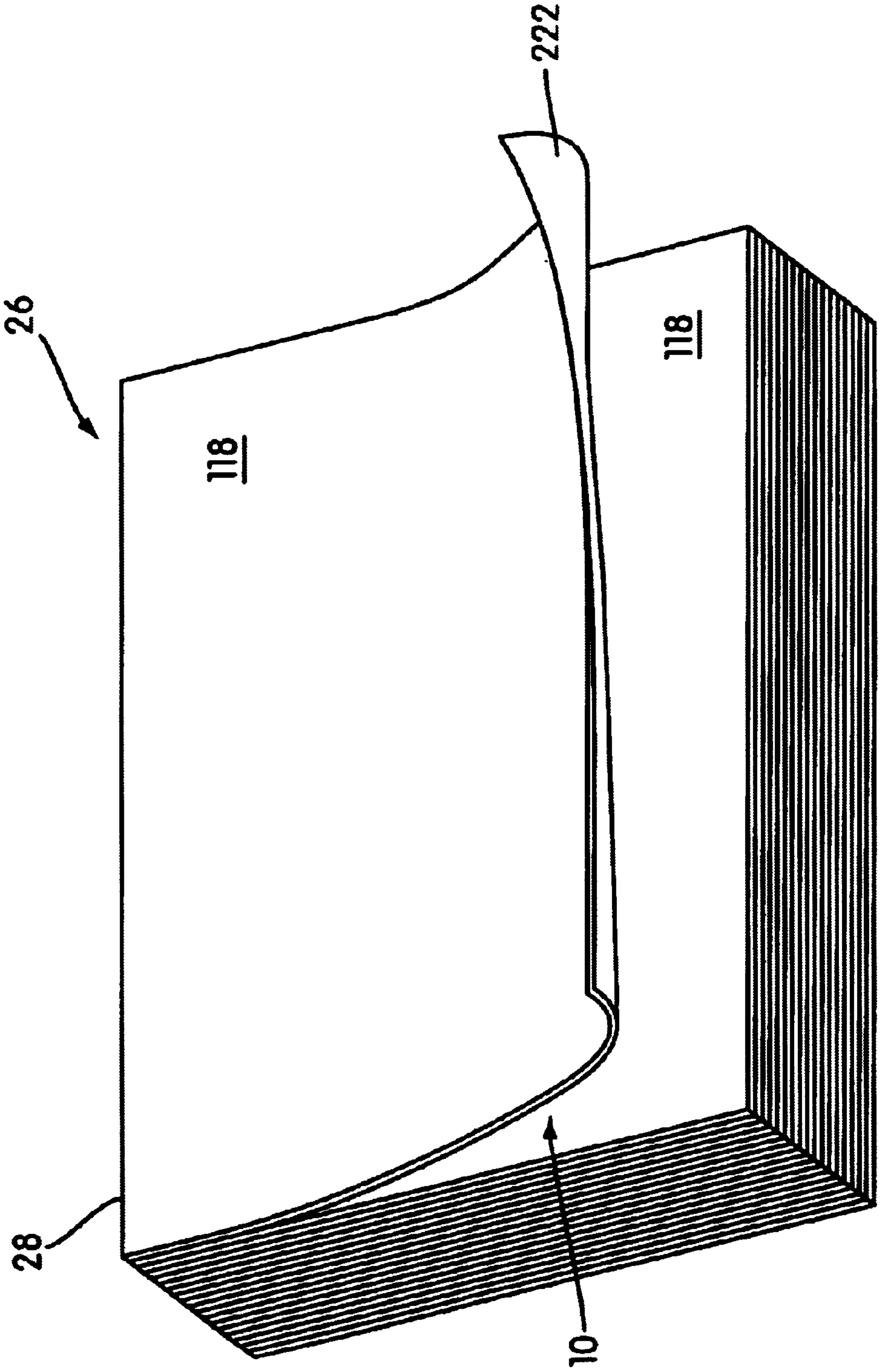
FIG. 6 is a schematic of the flexible and repositionable dry erasable markerboard cut into individual markerboards and fixed into a pad by adhering the pressure sensitive adhesive of the third layer of one markerboard to the dry erasable layer of the first layer of another markerboard.

FIG. 6 shows an alternate embodiment of the present invention wherein the individual repositionable dry erasable markerboards 10 are formed into a pad 26 by adhering the pressure sensitive adhesive layer 22 of one markerboard 10 to the dry erasable layer of another markerboard 10. In this embodiment, the pressure sensitive adhesive of the third layer 22 can be applied either to the entire lower surface 220 of the paper of the second layer (as shown) or the pressure sensitive adhesive of the of the third layer 22 can be applied in a strip at the top of the lower surface 220 of the paper of the second layer 20, parallel to the top edge 28 of the markerboard 10 (not shown).

Figure 7:
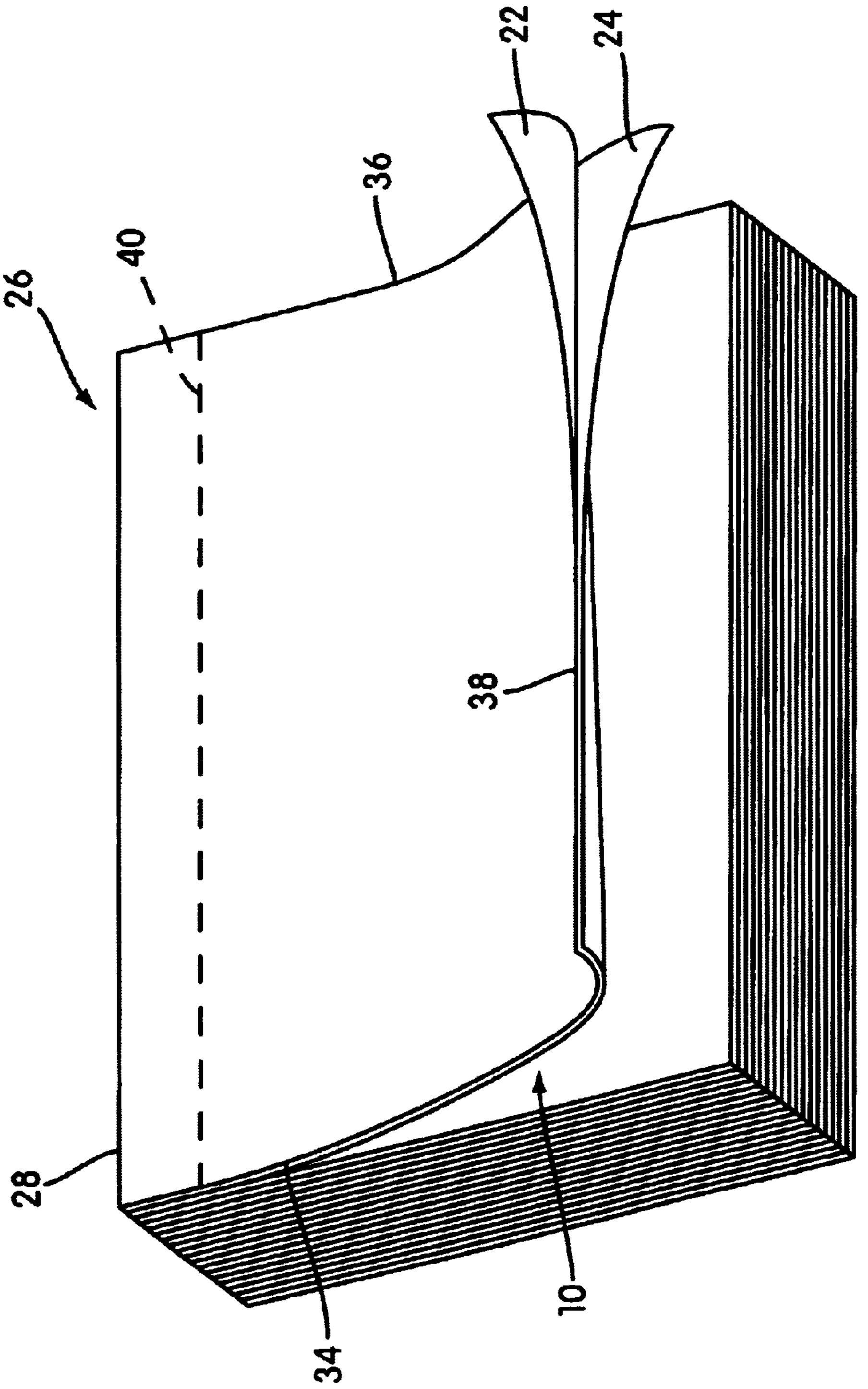
FIG. 7 is a schematic of the flexible and repositionable dry erasable markerboard cut into individual markerboards and fixed into a pad with a permanent adhesive applied above a line of perforations.
Figure 8:
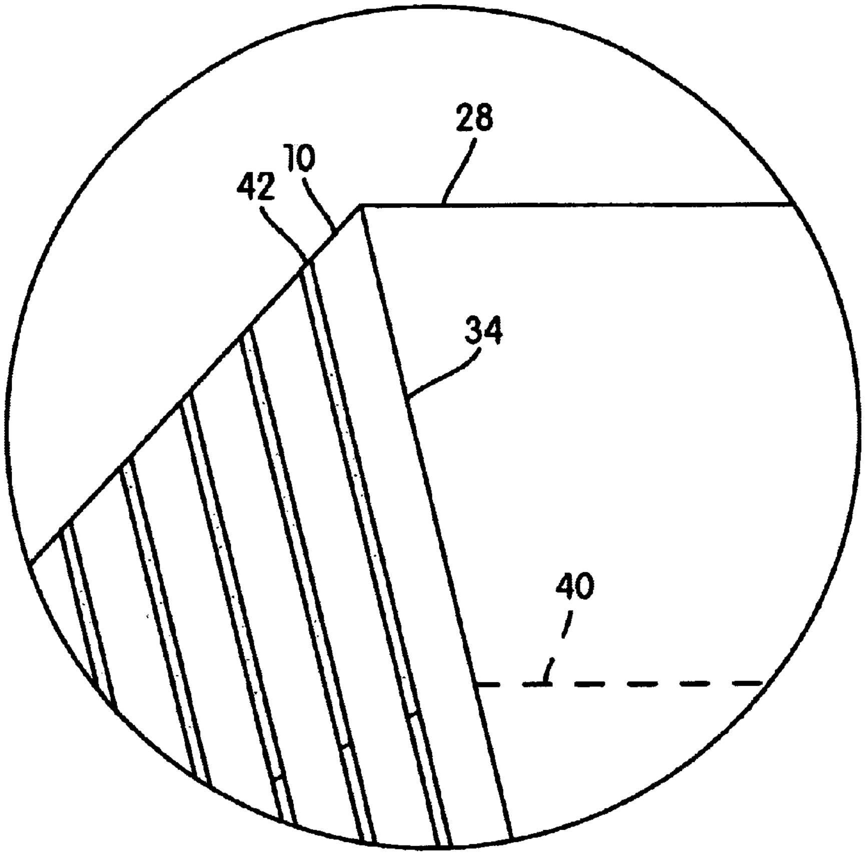
FIG. 8 is a magnified schematic of the flexible and repositionable dry erasable markerboard cut into individual markerboards and fixed into a pad with a permanent adhesive applied above a line of perforations.
Figure 9:
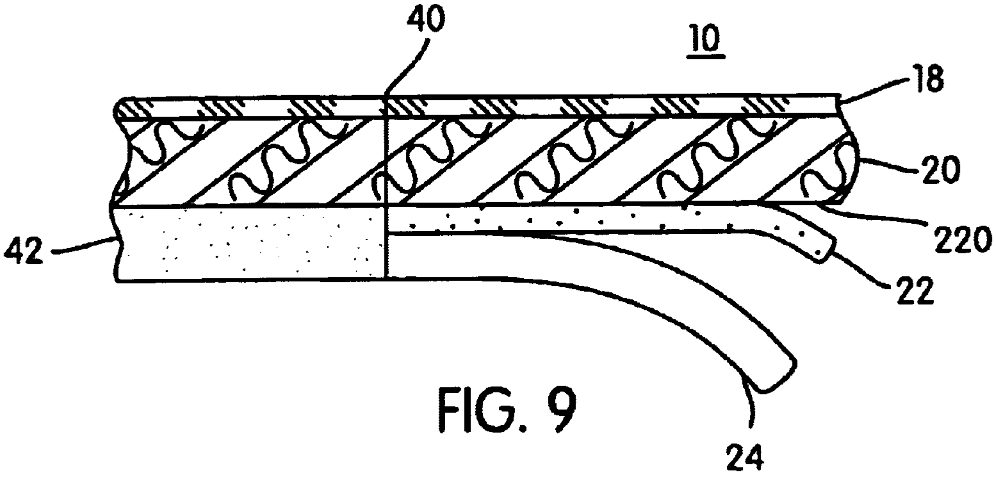
FIG. 9 is a schematic cross-sectional view of the present invention with a zone-coated permanent adhesive layer applied above a line of perforation and the removable liner layer applied to the zone-coated pressure sensitive adhesive layer applied below the line of perforations.

FIGS. 7, 8, and 9 show individual repositionable dry erasable marker boards 10 with line of perforations 40 which is parallel to top edge 28. The individual repositionable dry erasable marker boards 10 are adhered in a pad 26 with permanent adhesive layer 42. In this embodiment, the pressure sensitive adhesive of the third layer 22 is zone coated (as described in U.S. Pat. No. 4,980,212) or spot coated, on the lower surface 220 of the second layer 20 of each repositionable dry erasable markerboard 10 such that the pressure sensitive adhesive of the third layer 22 covers the lower surface 220 of the paper of the second layer 20 from the left edge 34 to the right edge 36 and from the line of perforations 40 to the bottom edge 38. Additionally, each repositionable dry erasable markerboard 10 is preferably zone coated or spot coated on lower surface 220 of the paper of the second layer 20 with permanent adhesive layer 42 from the top edge 28 to the line of perforation 40 and from the left edge 34 to the right edge 36. The removable liner of the fourth layer 24 is then applied so that it covers the repositionable pressure sensitive adhesive of the third layer 1, but not the permanent adhesive layer 42. In this manner, once the individual repositionable dry erasable markerboards 10 are stacked in a pad 32 such that all the repositionable dry erasable markerboards 10 face the same direction, they are secured by the permanent adhesive 42 until they are individually removed for use.

Figure 10:
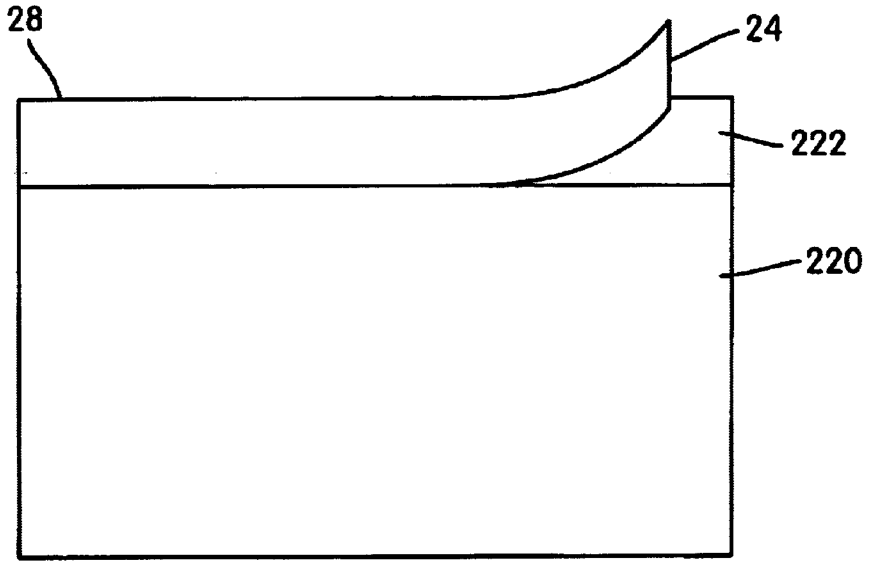
FIG. 10 is a schematic of the backside of the flexible and repositionable dry erasable markerboard, depicting a strip of zone-coated pressure sensitive adhesive parallel to the top edge of the markerboard; the adhesive is shown covered by a removable liner layer.
Figure 11:
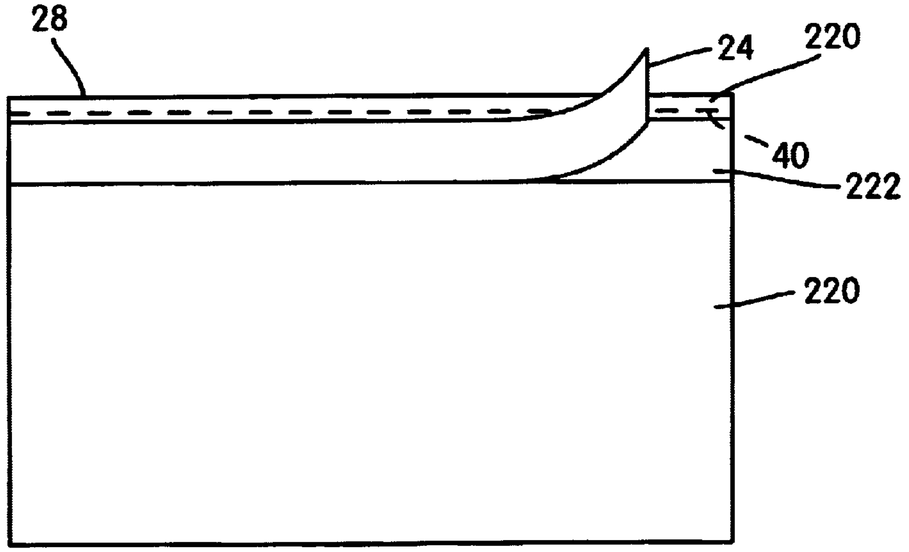
FIG. 11 is a schematic of the backside of the flexible and repositionable dry erasable markerboard, depicting a strip of zone-coated pressure sensitive adhesive parallel to the top edge of the markerboard, and below a line of perforations, also parallel to the top edge of the markerboard; the adhesive is shown covered by a removable liner layer.

FIG. 10 shows an alternate embodiment of the present invention that can be stacked in a pad and used as a flip chart. In this embodiment, the pressure sensitive adhesive of the third layer 22 is spot-coated or zone-coated in a strip along the top edge 28 of markerboard 10 such that each markerboard has a strip of the pressure sensitive adhesive of the third layer 22 along the top edge of the lower surface 220 of the paper layer 20. The pressure sensitive adhesive of the third layer 22 can then be covered with a removable liner of the fourth layer 24, as previously described. The remainder of lower surface 220 of the paper layer 20 is without adhesive. Preferably, the strip of the pressure sensitive adhesive of the third layer 22 covers enough area on lower surface 220 of the paper layer 20 to adequately adhere the markerboard 10 to the desired surface, yet enough of the lower surface 220 of paper layer 20 is adhesive-free to allow the pad to function as a flip chart. These markerboards can then be bound into a pad as previously described. Various modifications of this embodiment would be readily apparent to one of ordinary skill in the art. These modifications include applying the strip of repositionable pressure sensitive adhesive of the third layer 22 below a line of perforations 40 as shown in FIG. 11. Another modification is omitting the application of the removable liner of the fourth layer 24 and creating pads by adhering markerboards 10 to each other solely by contacting the repositionable pressure sensitive adhesive of the third layer 22 of a markerboard 10 to the dry erasable upper surface 118 ofthe first layer 18.

The repositionable dry erasable markerboard 10 is manufactured in a multi-stage process. Initially, the paper of the second layer 20 is preferably clay coated or coated with polyethylene if the dry erasable layer of the first layer 18 is a dry erase coating. Next, the dry erase coating is applied in a thickness of 0.0001–0.0015 inches to the upper side 120 of the second layer 20. This dry erase coating can be a UV curable coating designed to be applied under the presence of nitrogen, such as Northwest Coatings Corp.'s 17503 Dry Erase Topcoat. Preferably this dry erase coating is applied with a five roll coater, and then cured at 1000 feet/minute under a 1×300 watt UV lamp under the presence of a nitrogen blanket such that the oxygen levels in the atmosphere directly in contact with the UV curable coating while it is curing are under 20 parts per million. This dry erase coating also can be applied with a roll coater, by silkscreen using a 360–420 mesh, by flexographic process using a 15BCM anilox roll, by an electro beam-physical vapor deposition process, knife over roll, offset gravure, or by any other suitable process known in the art. A silicone-based dry erase coating may also be used.

Alternatively, a dry erase film can be used as the dry erasable layer of first layer 18. One such dry erase film is constructed from polypropylene as Flexcon's Flexmark® OP 100 Clear. Dry erase films that are heat-activated can be directly laminated to paper layer 20. One such heat-activated dry erase film is available from General Binding Corporation. The heat-activated dry erase film can be applied such that the side of the dry erase film containing the heat-activated adhesive is the lower surface 218 of the first layer 18. The lower surface 218 of the first layer 18 is then contacted with the upper surface 120 of the paper of the second layer 20 and then the dry erase film is laminated to the paper of the second layer 20 preferably between the temperatures of 135° C. to 150° C. Preferably, this lamination is accomplished on a web or roll-to-roll lamination machine with the rollers set to 135° C. to 150° C. and a pressure as suggested by the manufacturer of the particular laminating machine, up to approximately 60 psi.

Dry erase films are also commonly available with an acrylic pressure sensitive adhesive, such as V-22 adhesive, applied to one side of the film (not shown). The dry erase film can be applied such that the side of the dry erase film containing the acrylic adhesive is the lower surface 218 of the first layer 18. The lower surface 218 of the first layer 18 is then contacted with the upper surface 120 of the paper of the second layer 20 and then the dry erase film is laminated to the paper of the second layer 20 preferably between the temperatures of 40° F. to 176° F. and a pressure as suggested by the manufacturer of the particular laminating machine, up to approximately 60 psi. Preferably, the lower surface 218 of the first layer 18 made of dry erase film is laminated to the upper surface 120 of the paper of the second layer 20 at 40 psi. Clay coating or coating with polyethylene is not necessary when the dry erasable layer of the first layer 18 is a dry erase film, although in a preferred embodiment, clay coating or a coating of polyethylene may be used even when a dry erase film is used.

The pressure sensitive adhesive of the third layer 22 is applied to the lower surface 220 of the paper of the second layer 20. One possible pressure sensitive adhesive is National Starch's Multi-Lok 38-454A. This microsphere adhesive is applied at 8 to 10 pounds per every 3000 square feet. The adhesive can be direct coated, by means of a #20 Meyer rod or by the three roll reverse process. In the latter method, the adhesive is applied at two hundred feet per minute and is thermally cured in a hot air oven. The adhesive has a viscosity of 700 centipoises.

If the removable liner of the fourth layer 24 is desired, it is first coated with silicone on its upper surface 124. The silicone-coated upper surface 124 is then applied to the lower surface 222 of the pressure sensitive adhesive of the third layer 22 of markerboard 10, and then the removable liner of the fourth layer 24 and the third layer 22 are pressed together directly or indirectly by, for example, rollers.

From the above description it is apparent that the objects of the present invention have been achieved. While only certain embodiments have been set forth, alternative embodiments and various modifications will be apparent from the above description to those skilled in the art. For example, the removable liner of the fourth layer 24 can be optionally used with any of the described embodiments, and may be used to cover the entire pressure sensitive adhesive of the third layer 1, or a portion thereof, such as a corner or border (not shown) along a side of markerboard 10 or markerboard sheet 50. Additionally, while the, preferred embodiment is a multi-layer structure, more or fewer layers may be used if the objects of this invention are achieved. These and other alternatives are considered equivalents and within the spirit of the present invention.

What is claimed is:

1. A method for making a dry erasable substrate, the method comprising:

providing a base substrate;

coating a first surface of the base substrate with a radiation curable material that is dry erasable upon curing;

irradiating the radiation curable material in an atmosphere essentially devoid of oxygen so as to cure the radiation curable material thereby forming a dry erasable layer on the first surface of the base substrate.

2. A method according to claim 1, wherein the atmosphere in which the radiation curable material is irradiated has an oxygen content of less than 20 parts per million.

3. A method according to claim 2, wherein the atmosphere in which the radiation curable material is irradiated is a nitrogen blanket.

4. A method according to claim 1, wherein the radiation curable material is UV curable and wherein irradiating the radiation curable material comprises irradiating the radiation curable material with UV light.

5. A method according to claim 1, further comprising applying a pressure-sensitive adhesive on a second surface of the base substrate opposite the first surface.

6. A method according to claim 5, further comprising:

providing a release liner;

removably adhering the release liner to the pressure-sensitive adhesive layer.

7. A method according to claim 6, wherein the base substrate is flexible.

8. A method according to claim 6, further comprising rolling the dry erasable substrate into a roll or tube.

9. A method according to claim 1, further comprising arranging a plurality of the dry erasable substrates in a stack whereby individual ones of the stacked dry erasable substrates can be removed from the stack.

10. A method according to claim 9, wherein arranging the plurality of the dry erasable substrates in the stack includes removably adhering the dry erasable substrates in the stack to one another.

11. A method according to claim 10, further comprising providing a release liner for each dry erasable substrate and removably adhering the release liner to the pressure-sensitive adhesive layer of each dry erasable substrate, wherein the arranging the plurality of the dry erasable substrates in the stack includes removably adhering the dry erasable layer and the release liner of adjacent dry erasable substrates together.

12. A method according to claim 1, further comprising perforating the dry erasable substrate.

13. A method according to claim 1, wherein the base substrate is paper.

14. A method according to claim 13, wherein the first surface of the paper is clay coated or coated with polyethylene.

15. A method for making a dry erasable substrate, the method comprising:

providing a base substrate;

coating a first surface of the base substrate with a radiation curable material that is dry erasable upon curing;

irradiating the radiation curable material in an atmosphere having an oxygen content of less than 20 parts per million so as to cure the radiation curable material thereby forming a dry erasable layer on the first surface of the base substrate.

16. A method according to claim 15, wherein the atmosphere in which the radiation curable material is irradiated is a nitrogen blanket.

17. A method according to claim 15, wherein the radiation curable material is UV curable and wherein irradiating the radiation curable material comprises irradiating the radiation curable material with UV light.

18. A method according to claim 15, further comprising applying a pressure-sensitive adhesive on a second surface of the base substrate opposite the first surface.

19. A method according to claim 18, further comprising:

providing a release liner;

removably adhering the release liner to the pressure-sensitive adhesive layer.

20. A method according to claim 19, wherein the base substrate is flexible.

21. A method according to claim 20, further comprising rolling the dry erasable substrate into a roll or tube.

22. A method according to claim 15, further comprising arranging a plurality of the dry erasable substrates in a stack whereby individual ones of the stacked dry erasable substrates can be removed from the stack.

23. A method according to claim 22, wherein arranging the plurality of the dry erasable substrates in the stack includes removably adhering the dry erasable substrates in the stack to one another.

24. A method according to claim 23, further comprising providing a release liner for each dry erasable substrate and removably adhering the release liner to the pressure-sensitive adhesive layer of each dry erasable substrate, wherein the arranging the plurality of the dry erasable substrates in the stack includes removably adhering the dry erasable layer and the release liner of adjacent dry erasable substrates together.

25. A method according to claim 15, further comprising perforating the dry erasable substrate.

26. A method according to claim 15, wherein the base substrate is paper.

27. A method according to claim 26, wherein the first surface of the paper is clay coated or coated with polyethylene.

28. A method for making a dry erasable substrate, the method comprising:

providing a base substrate;

coating a first surface of the base substrate with a radiation curable material that is dry erasable upon curing;

irradiating the radiation curable material in a nitrogen blanket so as to cure the radiation curable material thereby forming a dry erasable layer on the first surface of the base substrate.

29. A method according to claim 28, wherein the nitrogen blanket in which the radiation curable material is irradiated has an oxygen content of less than 20 parts per million.

30. A method according to claim 28, wherein the radiation curable material is UV curable and wherein irradiating the radiation curable material comprises irradiating the radiation curable material with UV light.

31. A method according to claim 28, further comprising applying a pressure-sensitive adhesive on a second surface of the base substrate opposite the first surface.

32. A method according to claim 31, further comprising:

providing a release liner;

removably adhering the release liner to the pressure-sensitive adhesive layer.

33. A method according to claim 32, wherein the base substrate is flexible.

34. A method according to claim 33, further comprising rolling the dry erasable substrate into a roll or tube.

35. A method according to claim 28, further comprising arranging a plurality of the dry erasable substrates in a stack whereby individual ones of the stacked dry erasable substrates can be removed from the stack.

36. A method according to claim 35, wherein arranging the plurality of the dry erasable substrates in the stack includes removably adhering the dry erasable substrates in the stack to one another.

37. A method according to claim 36, further comprising providing a release liner for each dry erasable substrate and removably adhering the release liner to the pressure-sensitive adhesive layer of each dry erasable substrate, wherein the arranging the plurality of the dry erasable substrates in the stack includes removably adhering the dry erasable layer and the release liner of adjacent dry erasable substrates together.

38. A method according to claim 28, further comprising perforating the dry erasable substrate.

39. A method according to claim 28, wherein the base substrate is paper.

40. A method according to claim 39, wherein the first surface of the paper is clay coated or coated with polyethylene.

* * * * *